United States Patent
Jain

(10) Patent No.: US 10,063,908 B2
(45) Date of Patent: Aug. 28, 2018

(54) WEARABLE DEVICE CAPABLE OF DISPLAYING INFORMATION ASSOCIATED WITH A MULTIMEDIA SYSTEM

(71) Applicant: TP Vision Holding B.V., Amsterdam (NL)

(72) Inventor: Vikas Jain, Karnataka (IN)

(73) Assignee: TP VISION HOLDING B.V., Amsterdam (NL)

(*) Notice: Subject to any disclaimer, the term of this patent is extended or adjusted under 35 U.S.C. 154(b) by 0 days.

(21) Appl. No.: 15/419,531

(22) Filed: Jan. 30, 2017

(65) Prior Publication Data

US 2018/0091848 A1 Mar. 29, 2018

(30) Foreign Application Priority Data

Sep. 27, 2016 (CN) .......................... 2016 1 0854599

(51) Int. Cl.
| | | |
|---|---|---|
| *H04N 21/482* | (2011.01) | |
| *H04N 21/431* | (2011.01) | |
| *H04N 21/41* | (2011.01) | |
| *H04N 21/414* | (2011.01) | |
| *H04N 21/472* | (2011.01) | |
| *H04N 21/433* | (2011.01) | |
| *G06F 3/0484* | (2013.01) | |

(52) U.S. Cl.
CPC ..... *H04N 21/4312* (2013.01); *H04N 21/4126* (2013.01); *H04N 21/41407* (2013.01); *H04N 21/4333* (2013.01); *H04N 21/47217* (2013.01); *H04N 21/482* (2013.01); *G06F 3/04847* (2013.01)

(58) Field of Classification Search
CPC .......... H04N 21/4312; H04N 21/4126; H04N 21/41407; H04N 21/47217; H04N 21/482; G06F 3/04847
USPC .......................................................... 725/38
See application file for complete search history.

(56) References Cited

U.S. PATENT DOCUMENTS

| | | | |
|---|---|---|---|
| 2013/0016048 A1* | 1/2013 | So ........................... | G06F 3/038 345/173 |
| 2015/0281024 A1* | 10/2015 | Janky ...................... | H04L 43/50 370/252 |
| 2016/0320932 A1* | 11/2016 | Belhumeur ......... | G06F 3/04842 |
| 2017/0024121 A1* | 1/2017 | Park ..................... | G06F 3/04845 |
| 2017/0052695 A1* | 2/2017 | Lee ...................... | G06F 3/04883 |
| 2017/0102855 A1* | 4/2017 | Kwon ................. | G06F 3/04817 |
| 2017/0188086 A1* | 6/2017 | Mardirossian ... | H04N 21/47217 |

* cited by examiner

Primary Examiner — Nathan Flynn
Assistant Examiner — Caroline Somera
(74) Attorney, Agent, or Firm — Hamre, Schumann, Mueller & Larson, P.C.

(57) ABSTRACT

A wearable device includes a display unit, a communication unit and a processing unit. When the wearable device has established communication with a multimedia system through the communication unit, the processing unit selectively operates in a bending-line mode in which the processing unit causes the display unit to display a bending line which extends beside a visible boundary of the display unit around a reference point within a display region defined by the visible boundary, and which is associated with information provided by the multimedia system.

22 Claims, 14 Drawing Sheets

WEARABLE DEVICE CAPABLE OF DISPLAYING INFORMATION ASSOCIATED WITH A MULTIMEDIA SYSTEM

CROSS-REFERENCE TO RELATED APPLICATION

This application claims priority of Chinese Patent Application No. 201610854599.4, filed on Sep. 27, 2016.

FIELD

The disclosure relates to a wearable device, and more particularly to a wearable device capable of displaying information associated with a multimedia system.

BACKGROUND

Conventional computerized devices, such as computers, smartphones, etc., use a straight bar to represent information such as a progress of a procedure, a time length of a video/audio content, etc. When watching a video, a user may drag or tap a straight progress bar to reproduce the video at a desired video time point.

However, when the straight bar is applied to a wearable device such a smartwatch, the small screen thereof may make it difficult to view information and/or perform operation on the straight bar.

SUMMARY

Therefore, an object of the disclosure is to provide a wearable device that can alleviate at least one of the drawbacks of the prior art.

According to the disclosure, the wearable device includes an output unit, a communication unit and a processing unit. The output unit is configured to provide perceivable output to users, and includes a display unit. The display unit has a visible boundary that defines a display region, and is configured to display images within the display region. The communication unit is configured to establish communication with a multimedia system for signal and data transmission therewith. The processing unit is coupled to the display unit for signal and data transmission therewith, is coupled to the communication unit for signal and data transmission therewith, and is configured to, when the communication unit has established communication with the multimedia system, selectively operate in one of a plurality of multimedia modes that include at least one bending-line mode in which the processing unit causes the display unit to display within the display region a bending line that extends beside the visible boundary around a reference point within the display region, and that is associated with information provided by the multimedia system.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
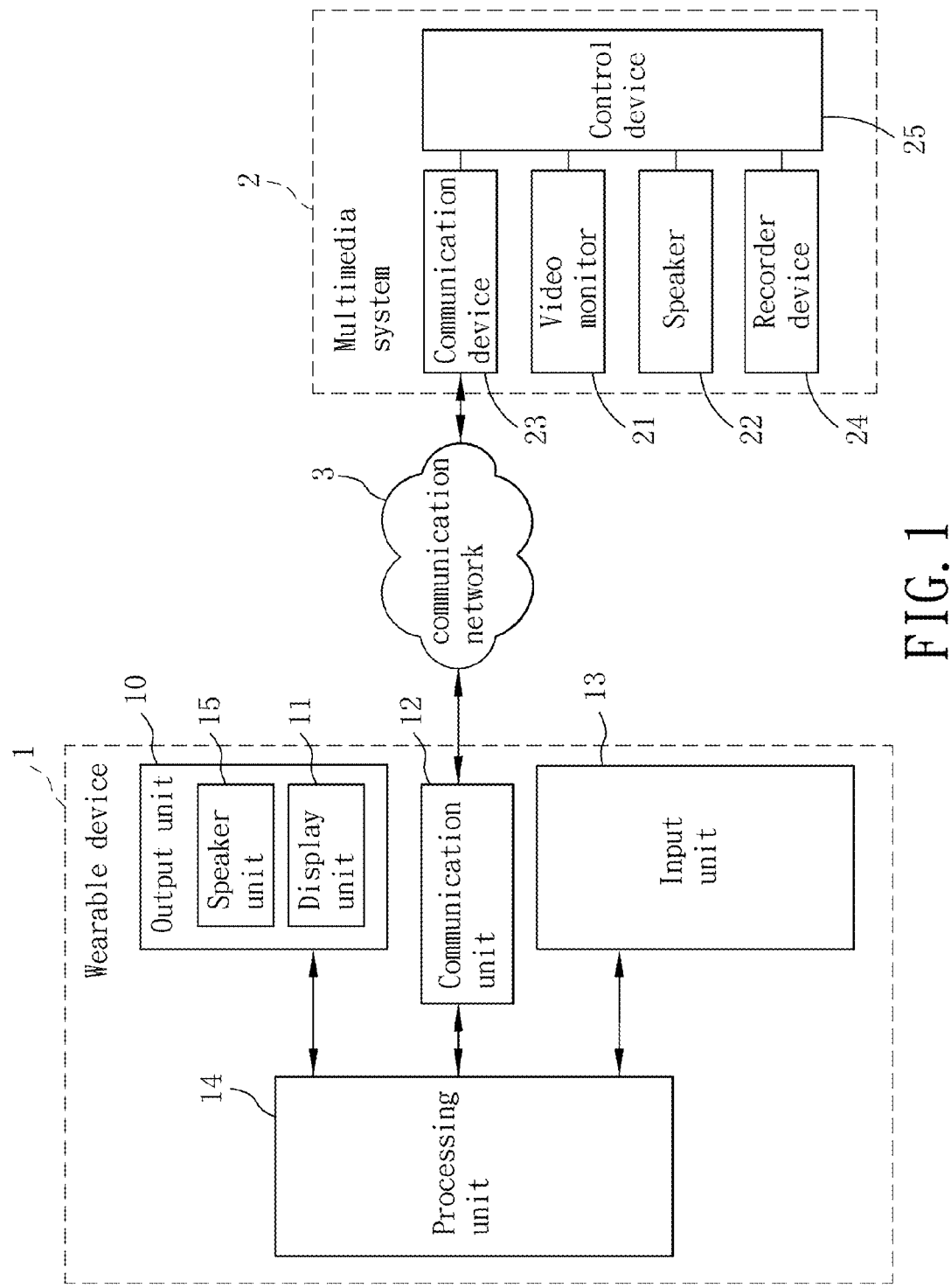
FIG. 1 is a block diagram illustrating an embodiment of a wearable device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
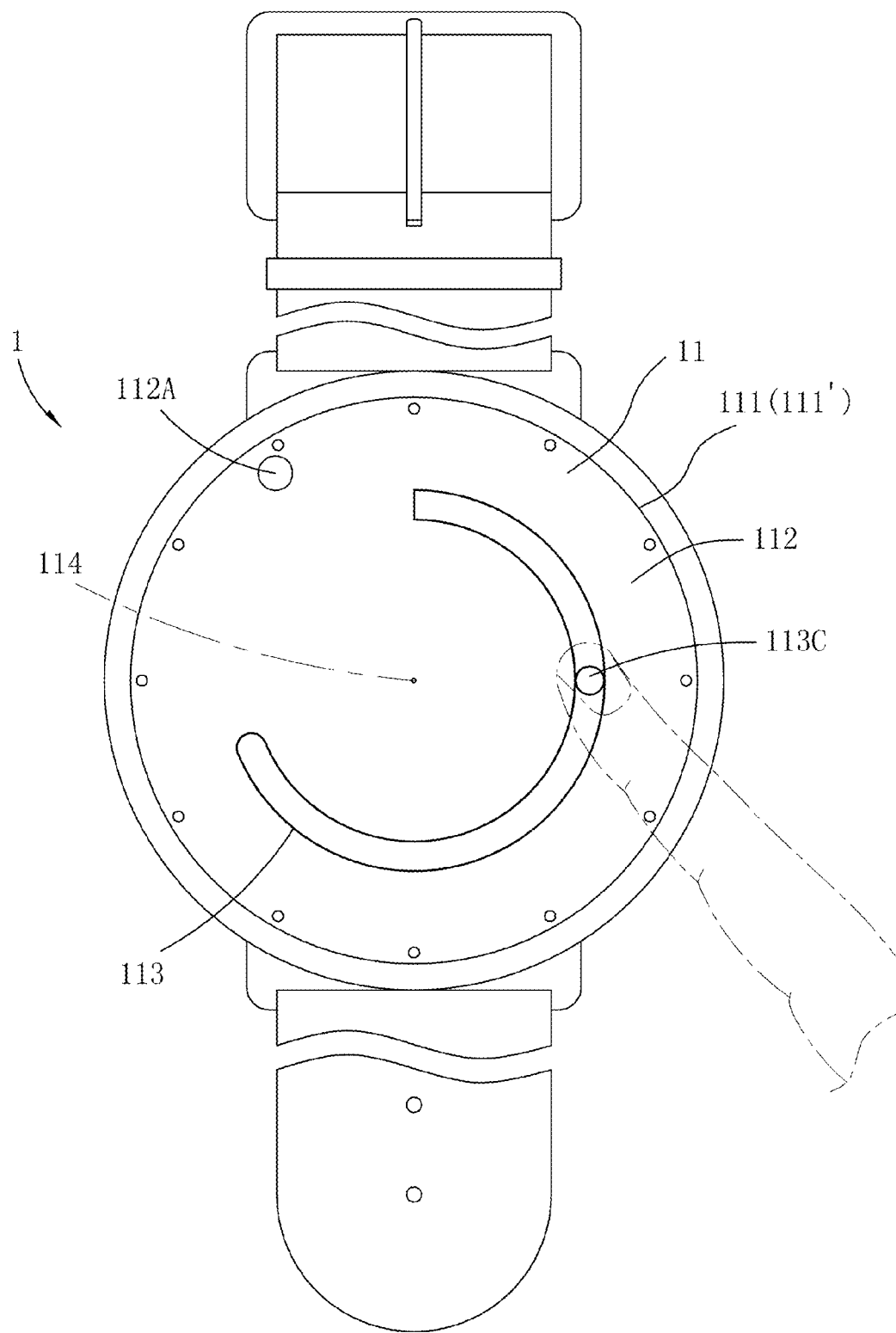
FIG. 2 is a schematic diagram illustrating the embodiment of the wearable device.

Referring to FIGS. 1 and 2, an embodiment of a wearable device 1 according to this disclosure is shown to be capable of wireless communication with a multimedia system 2 via a communication network 3. In this embodiment, the wearable device 1 is a smartwatch, the multimedia system 2 may be a television (TV) system having recorder functions, and the communication network 3 may employ protocols such as UPnP/DLNA, JSON APIs over HTTP/HTTPS, etc., but this disclosure is not limited thereto.

The wearable device 1 includes an output unit 10 to provide perceivable output to users, a communication unit 12 to establish communication with the multimedia system 2 for signal and data transmission therewith, an input unit 13, and a processing unit 14 coupled to the abovementioned components 10, 12, 13 for signal and/or data transmission therewith.

The output unit 10 is configured to provide perceivable output to users in a form of, for example, image/video, sound/audio, and/or haptic/tactile feedback (e.g., vibration), and includes a display unit 11 and a speaker unit 15 in this embodiment. In other embodiments, the output unit 10 may further include a vibrator to provide haptic/tactile feedback, or provide the perceivable output in only one or two of the forms, and this disclosure is not limited to such. The display unit 11 includes a frame/rim 111' that physically forms an outer edge of the display unit 11 and a visible boundary 111 defining a display region 112, and a screen that forms the display region 112. The display unit 11 is configured to display images within the display region 112. It is noted that the visible boundary 111 is not necessarily circular, and may be of any other shape (e.g., rectangle) as desired. In other embodiments, the visible boundary 111 may be formed by a non-displaying area within the frame 111', or be virtually formed by the screen displaying a virtual boundary. In other words, the display region 112 is not necessarily defined by the frame 111' in this disclosure.

The input unit 13 is configured to sense a user input for triggering operation associated with images displayed in the display region 112. In this embodiment, the input unit 13 includes a touch screen coincided with the screen of the display unit 11 for sensing the user input with respect to the display region 112, but this disclosure is not limited thereto. For example, the input unit 13 may include a speaker and a microphone to form a sonar system to employ technology such as FingerIO, which is developed by University of Washington, to track user operation in a space around the wearable device 1 in a form of, for example, finger operation on a table, mid-air gestures, etc. In this embodiment, the multimedia system 2 is a television system that exemplarily includes a video monitor 21, a speaker 22, a communication device 23, a recorder device 24 and a control device 25 that is coupled to the abovementioned devices 21-24 for signal and/or data transmission therewith and that receives signals of multimedia content (e.g., TV programs) from content providers. After the wearable device 1 is paired with the multimedia system 2, i.e., the communication unit 12 has established communication with the communication device 23 via the communication network 3, the control device 25 may tune to a user desired channel, provide program data of one or more channels to the wearable device 1, and control operation of the video monitor 21, the speaker 22 and the recorder device 24 to, for example, reproduce and/or record the TV programs, based on signals/commands provided by the wearable device 1. In other embodiments, the multimedia system 2 may be a radio system that receives and reproduces audio programs, or a computer system that stores video/audio files, and the disclosure is not limited to such.

When the communication unit 12 has established communication with the multimedia system 2, the processing unit 14 may selectively operate in one of a plurality of multimedia modes.

In this embodiment, the multimedia modes exemplarily include, but are not limited to, a channel-view mode, and a plurality of bending-line modes in which the processing unit 14 causes the display unit 11 to display within the display region 112 a bending line 113 which extends beside/along the visible boundary 111 around an imaginary reference point 114 within the display region 112 (e.g., a center of the display region 112), and which is associated with information provided by the multimedia system 2; the bending-line modes exemplarily include, but are not limited to, a program-view mode, and a plurality of bending line control modes in which the processing unit 14 may control operation of the multimedia system 2 when the input unit 13 senses a user input for triggering operation associated with the bending line 113 (e.g., tapping on a desired position 113C on the bending line 113); and the bending line control modes exemplarily include, but are not limited to, a time-shift buffering mode, a scheduled recording mode, a playback mode, a plurality of setting control modes, and a list-view mode. However, the disclosure is not limited to the above examples. In some of the multimedia modes, the processing unit 14 may cause the display unit 11 to display a mode selection mark 112A proximate to the visible boundary 111. When the input unit 13 senses a user input for triggering operation associated with the mode selection mark 112A (e.g., tapping on the mode selection mark 112A), the processing unit 14 starts to operate in another one of the multimedia modes. Operations of the wearable device 1 in the abovementioned multimedia modes are described in more detail hereinafter.

Figure 3:
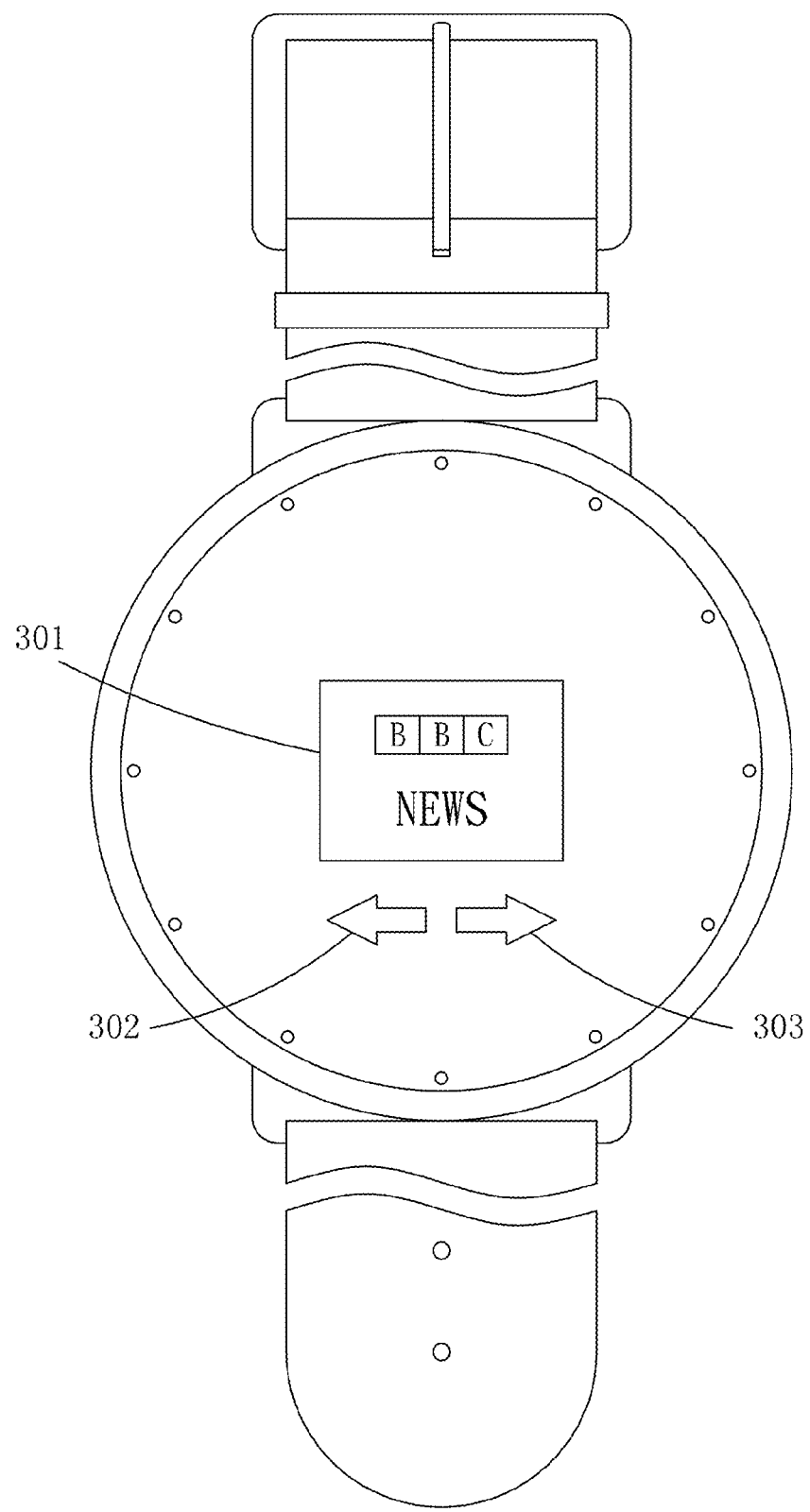
FIGS. 3-13 are schematic diagrams illustrating the embodiment of the wearable device operating in various multimedia modes.

1. Channel-view mode: Referring to FIGS. 1 and 3, the processing unit 14 controls the multimedia system 2 to provide channel information (e.g., a channel logo 301) associated with a currently tuned channel to the wearable device 1, and causes the display unit 11 to display the channel information. When the input unit 13 senses a user input for triggering operation of program viewing (e.g., double tapping on the channel logo 301), the processing unit 14 starts to operate in the program-view mode. When the input unit 13 senses a user input for triggering operation of channel changing (e.g., tapping on a left arrow 302 representing a previous channel, or a right arrow 303 representing a next channel), the processing unit 14 controls the multimedia system 2 to tune to another one of multiple different channels. The user input for triggering operation of channel changing may also employ a clockwise gesture for tuning to the channels after the currently tuned channel one by one (i.e., channel zapping in a forward direction), and a counterclockwise gesture for tuning to the channels before the currently tuned channel one by one (i.e., channel zapping in a backward direction). When the input unit 13 senses that the user input for triggering operation of channel changing has lasted for a predetermined duration (e.g., a continuous clockwise or counterclockwise gesture), the processing unit 14 controls the multimedia system 2 to accelerate tuning to the different channels (i.e., fast channel zapping).

Figure 4:
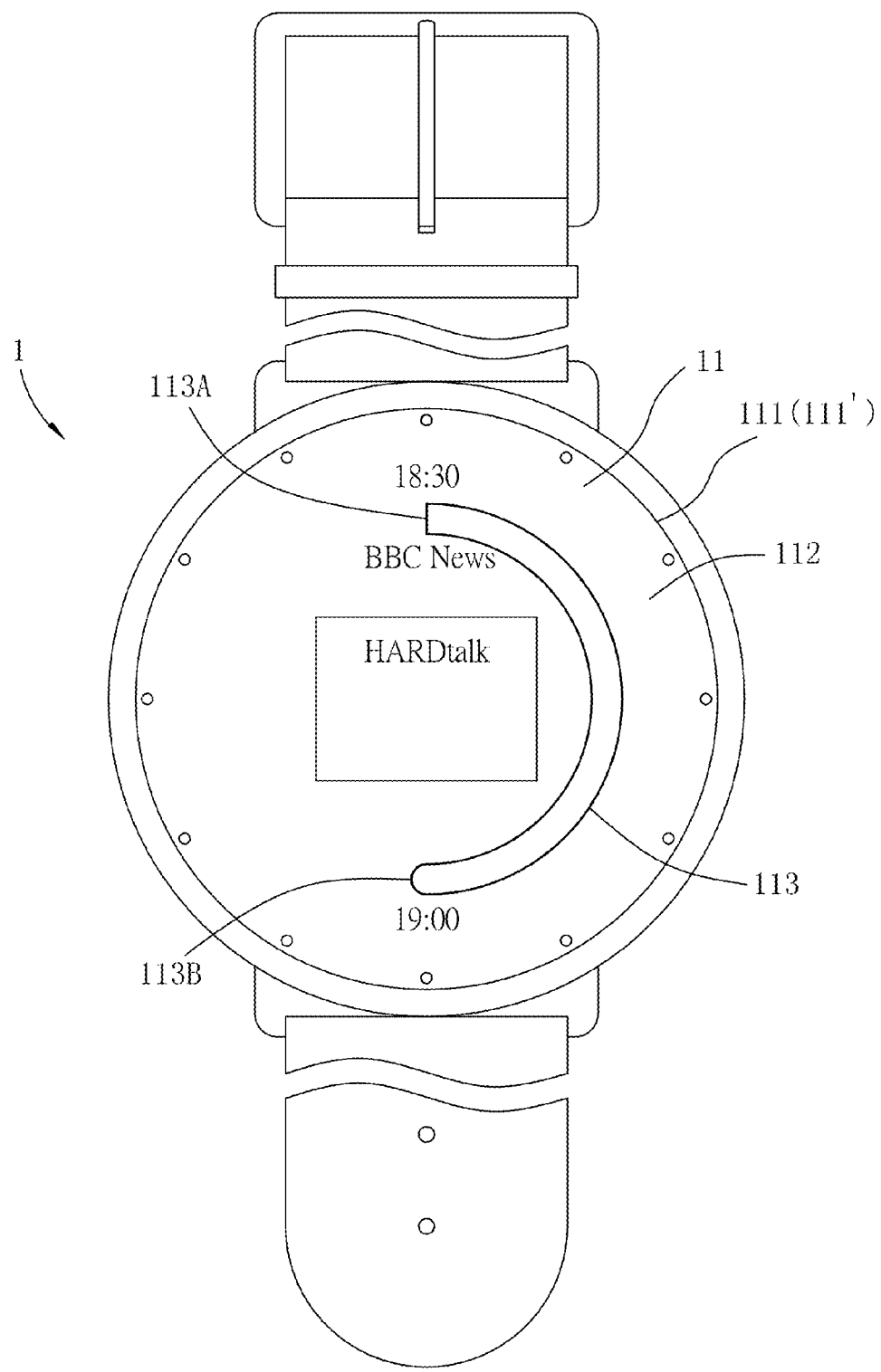
Figure 5:
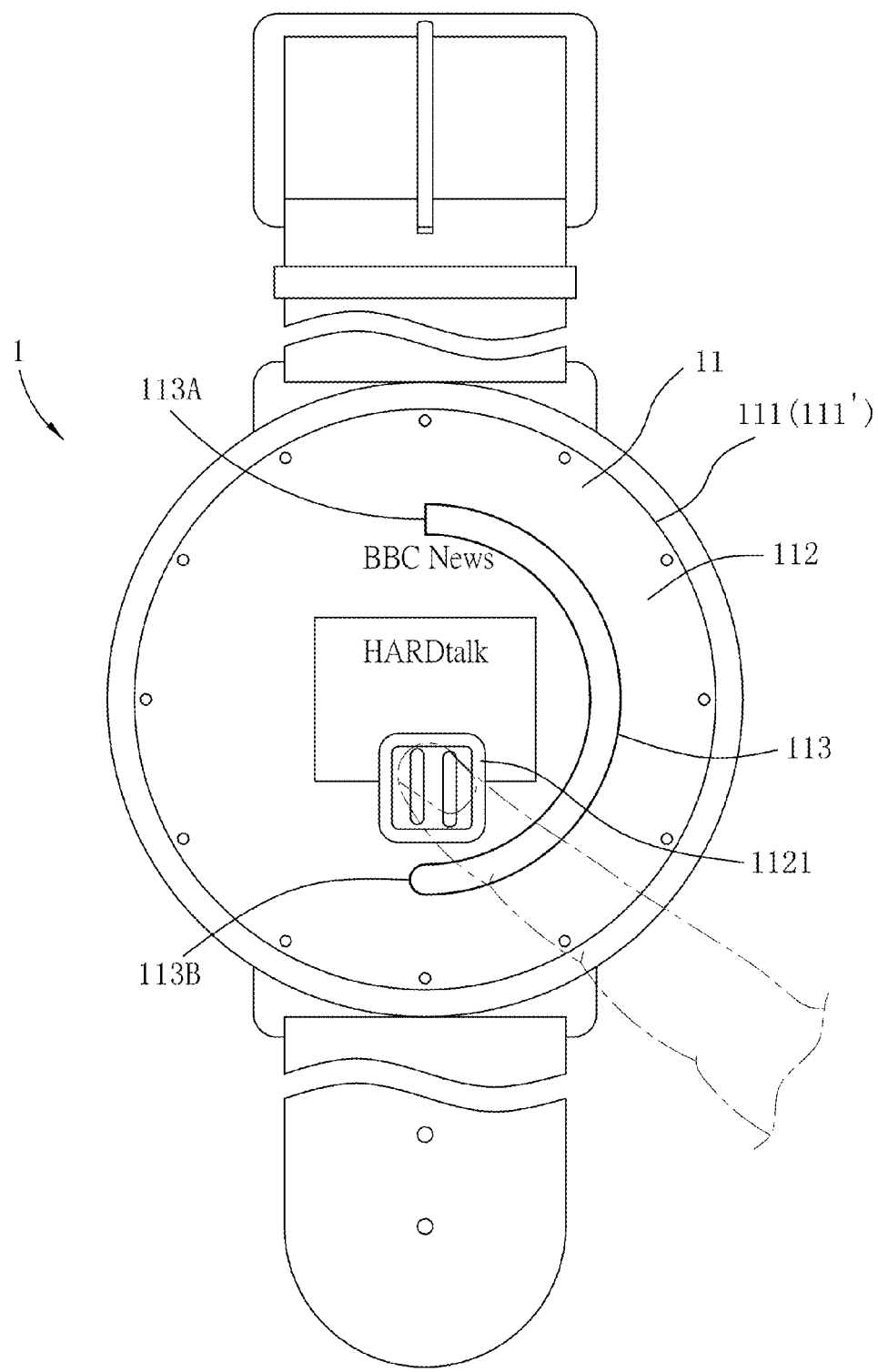

2. Program-view mode: Referring to FIGS. 1 and 4, the processing unit 14 controls the multimedia system 2 to provide program information associated with a multimedia program of a currently tuned channel (e.g., program logo, start time, end time, etc. of a multimedia program "HARDtalk" of a currently tuned channel "BBC News", as shown in FIG. 4), and causes the output unit 10 to output the program information. In detail, the program information is visually outputted by the display unit 11 (e.g., displaying the program content or the program logo "HARDtalk" in a thumbnail, etc.) and/or audibly outputted by the speaker unit 15 (e.g., producing sound of the program content). In this embodiment, the bending line 113 has a start point 113A corresponding to a time point (e.g., 18:30) at which the multimedia program of the currently tuned channel provided by the multimedia system 2 starts, and an end point 113B corresponding to a time point (e.g., 19:00) at which the multimedia program ends, and extends from the start point 113A to the end point 113B in a clockwise direction with the start point 113A at a twelve o'clock position with respect to the display region 112. When the input unit 13 senses a user input for triggering operation of introducing another program (e.g., a horizontal gesture in a right/left direction corresponding to a previous/next program, or continuously pressing on the start/end point 113A/113B for a predetermined time period, such as three seconds, for skipping to the previous/next program, etc.), the processing unit 14 controls the multimedia system 2 to provide program information (e.g., program detail introduction, program duration, etc.) associated with another multimedia program of the currently tuned channel, and causes the display unit 11 to display the program information associated with the another multimedia program. When the input unit 13 senses a user input for triggering operation of introducing another channel (e.g., a vertical gesture in an upward/downward direction corresponding to a next/previous channel), the processing unit 14 controls the multimedia system 2 to provide program information (e.g., program introduction, program duration, etc.) associated with a multimedia program of another channel, causes the display unit 11 to display the program information associated with the multimedia program of the another channel without tuning to the another channel (i.e., the display unit 11 still outputs the program information associated with the multimedia program of the currently tuned channel, e.g., the display unit 11, while continuing to display the program content and/or producing sound of the program content of the multimedia program of the currently tuned channel, also displays the program introduction of the multimedia program of the another channel), and controls the multimedia system 2 to tune to the another channel when the input unit 13 senses a user input for triggering operation of channel tuning (e.g., double tapping). When the input unit 13 senses a user input for triggering operation of pausing (e.g., tapping on a pause icon 1121, which may be revealed as an overlay over the thumbnail after tapping on the display region 112, as shown in FIG. 5), the processing unit 14 operates such that the output of the program information associated with the multimedia program of the currently tuned channel by the output unit 10 is paused, and starts to operate in the time-shift buffering mode.

Figure 6:
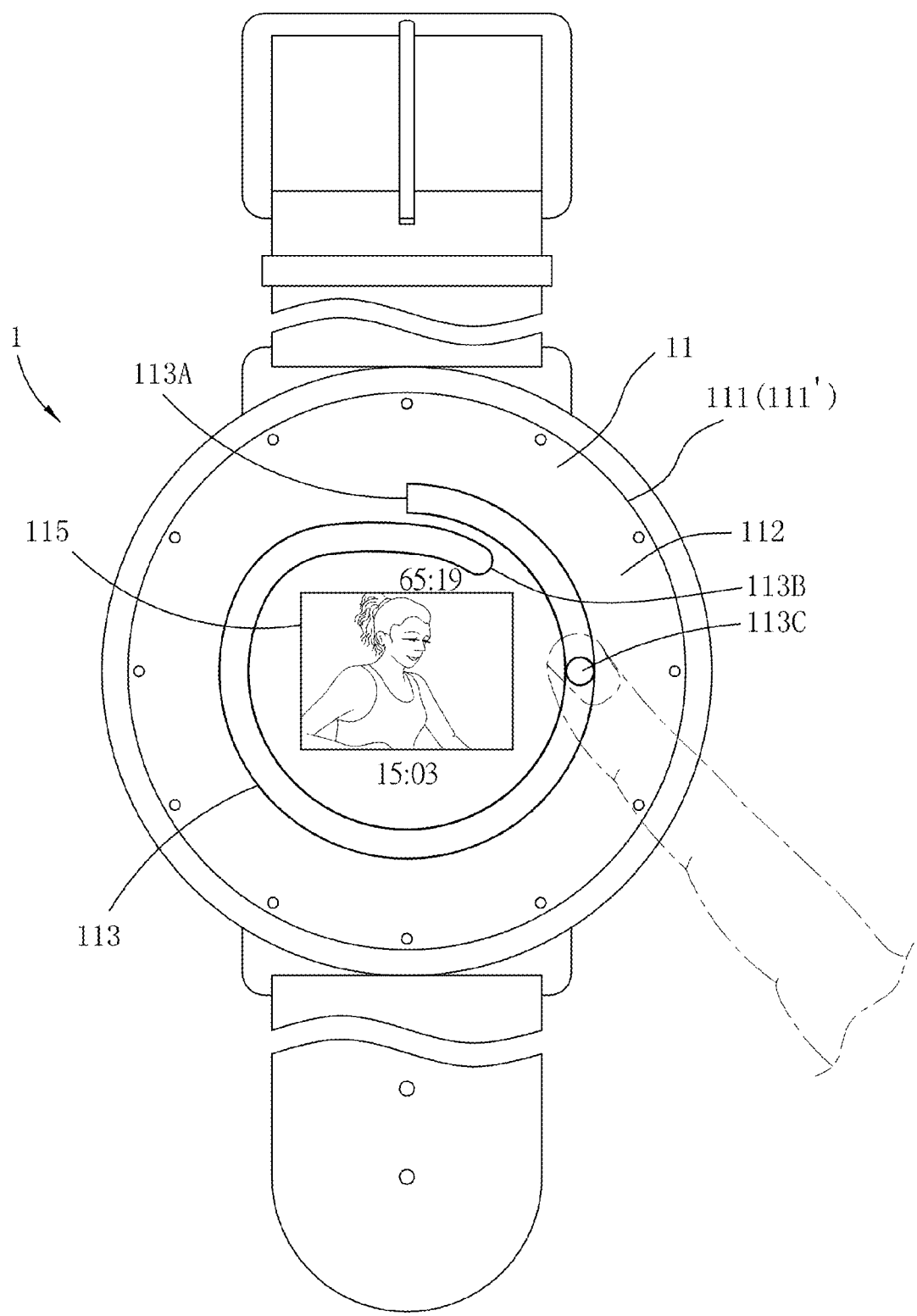

3. Time-shift buffering mode: Referring to FIGS. 1 and 6, the processing unit 14 controls the multimedia system 2 to record the multimedia program. The bending line 113 represents a time period (e.g., the time period of "65:19") of time-shift buffering between a pause time point at which the multimedia system 2 starts to record the multimedia program and a current time point, and has a start point 113A corresponding to the pause time point, and an endpoint 113B corresponding to the current time point. When the input unit 13 senses a user input for triggering operation associated with a user-desired position 113C on the bending line 113, the processing unit 14 controls the multimedia system 2 to provide to the wearable device 1 a portion of recorded content of the multimedia program at a user-desired time point (e.g., the time point "15:03" of the recoded content) corresponding to the user-desired position 113C on the bending line 113, and causes the output unit 10 to output the portion of the recorded content at the user-desired time point in a form of, for example, a screenshot 115, followed by reproducing the recorded content of the multimedia program from the user-desired time point. It is noted that information of the time-shift buffering would keep on updating after the pausing, so the end point 113B of the bending line 113 may move in dial form during the recording. When the time period of the recorded content approaches a predetermined time period (e.g., 60 minutes) that corresponds to a closed loop, the end point 113B of the bending line 113 moves closer to the reference point 114 (see FIG. 2) when approaching the start point 113A of the bending line 113, such that the bending line 113 extends in a form of a spiral when the time period of the recorded content has exceeded the predetermined time period.

Figure 7:
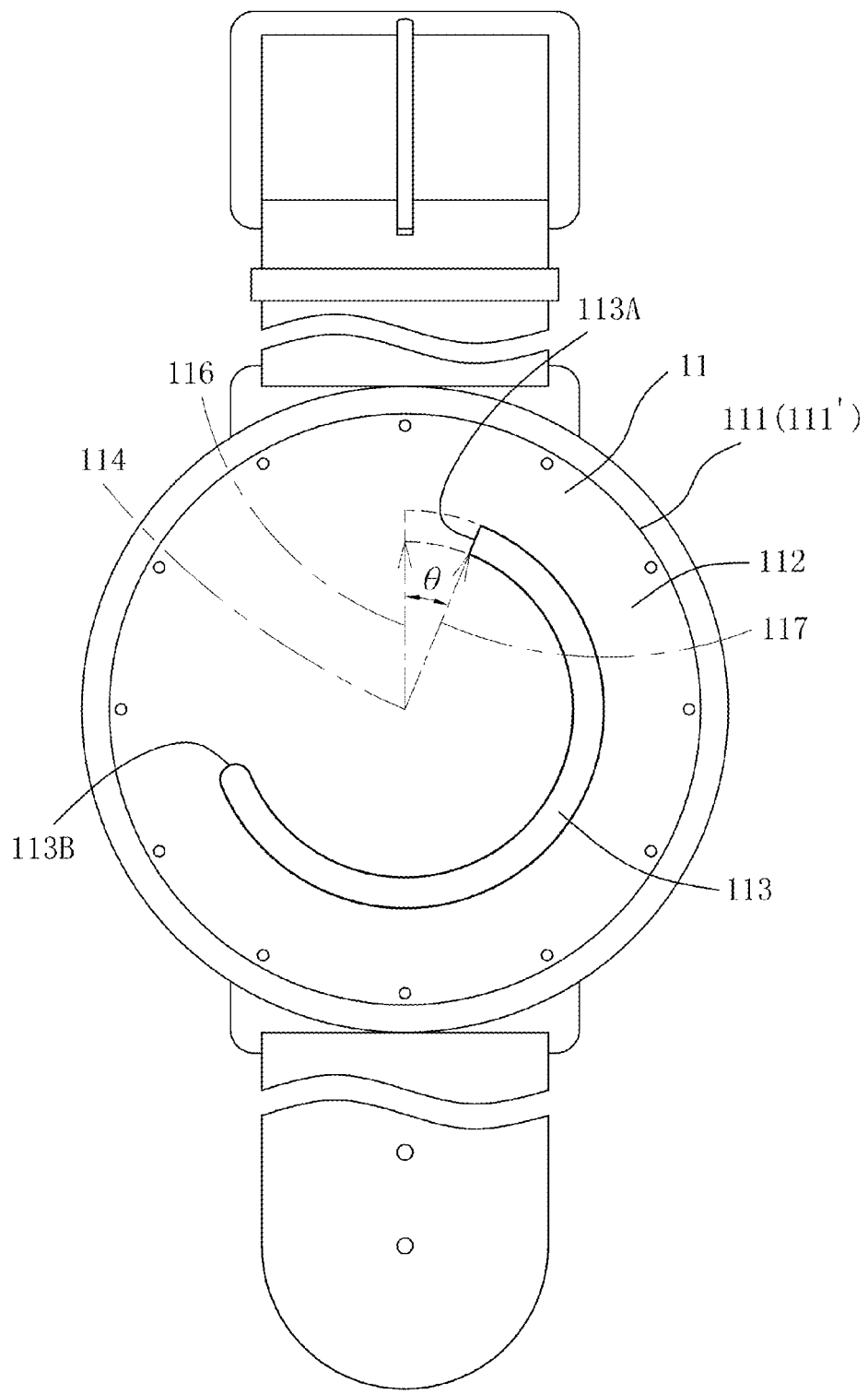
Figure 8:
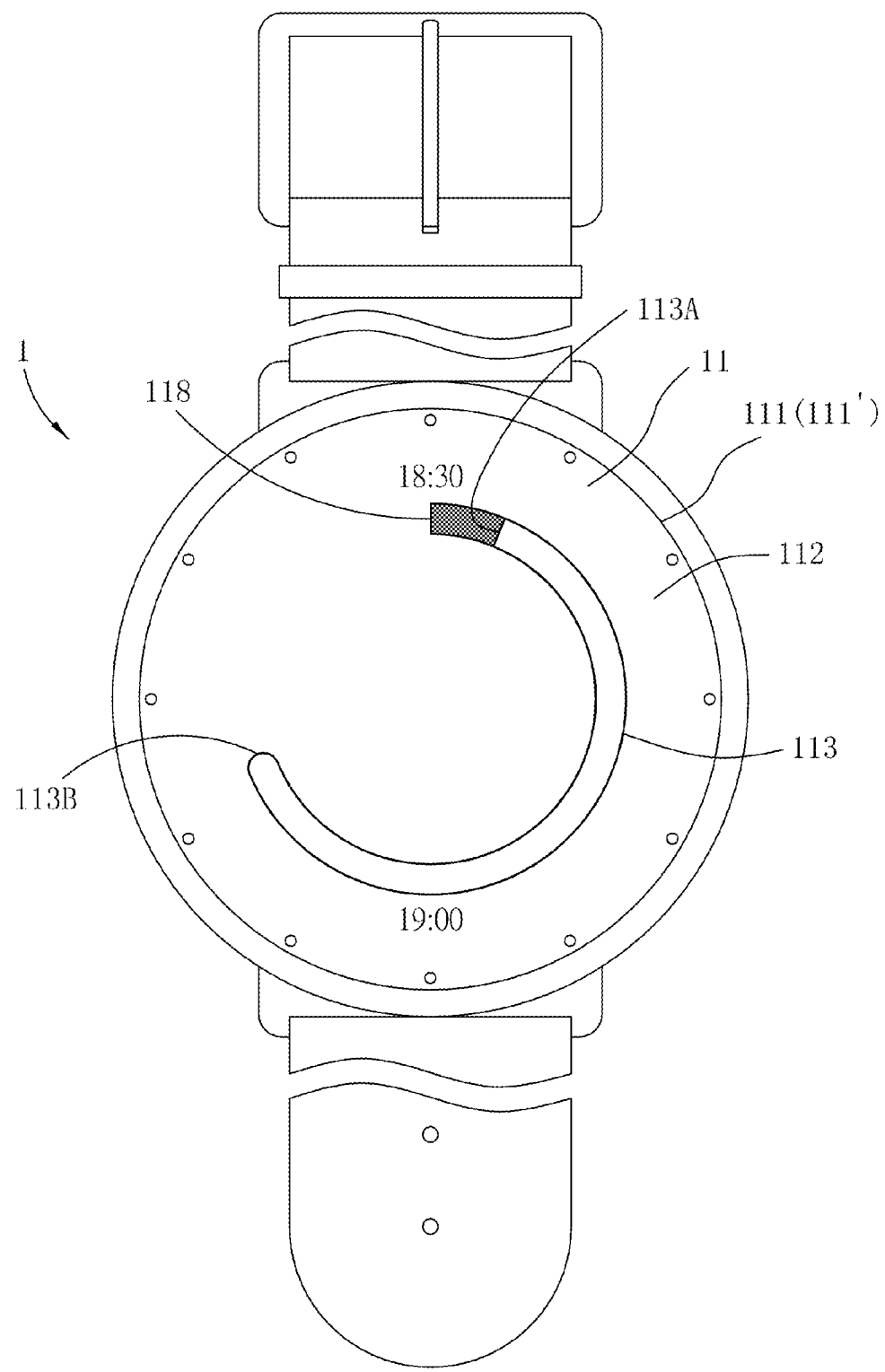
Figure 9:
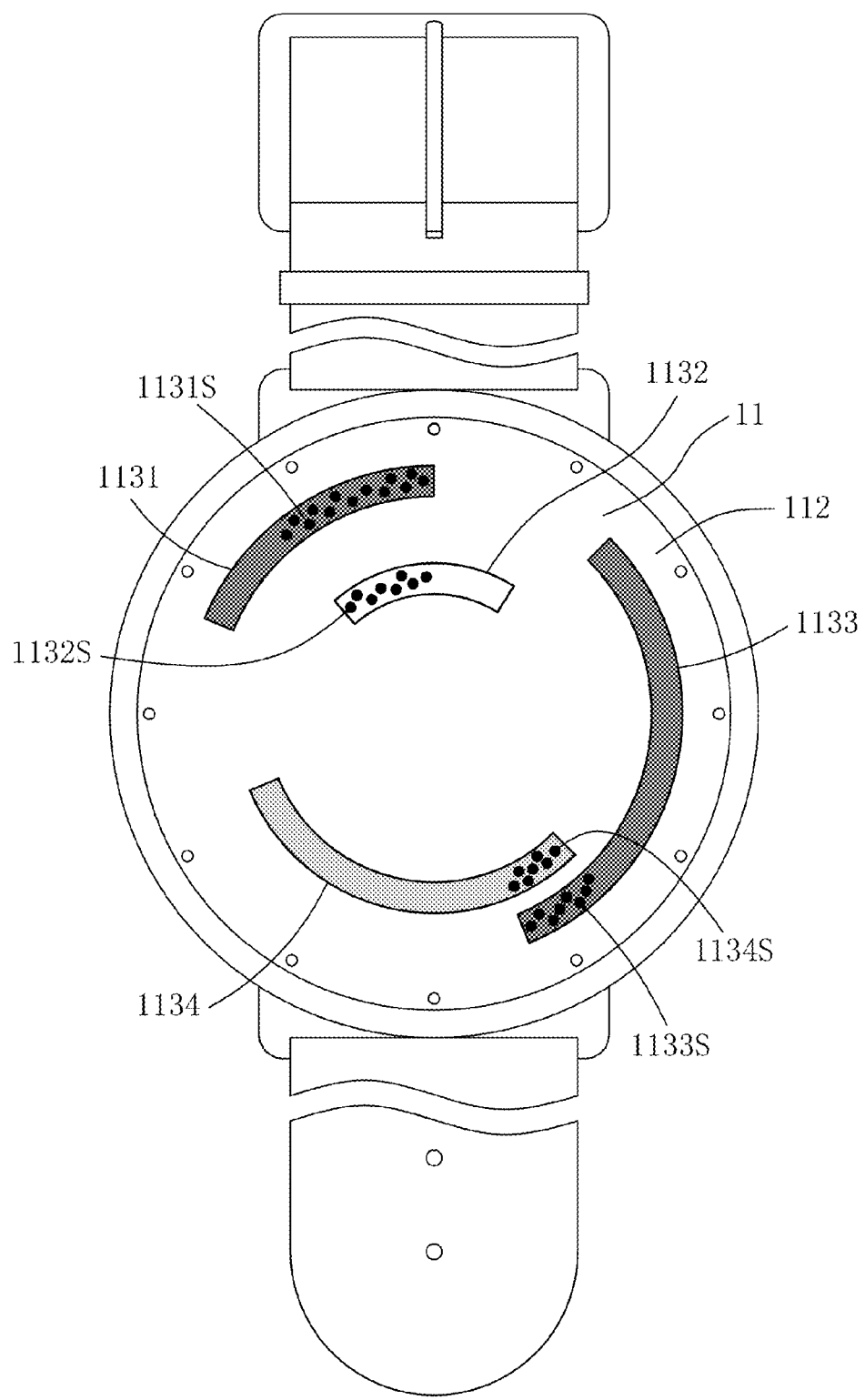

4. Scheduled recording mode: Referring to FIGS. 1 and 7, the bending line 113 represents a time period of a multimedia content fragment between a start time point at which the multimedia system 2 is scheduled to start recording of a multimedia content of a channel, and an end time point at which the multimedia system 2 is scheduled to stop the recording of the multimedia content, and has a start point 113A corresponding to the start time point, and an end point 113B corresponding to the end time point. An angle (θ) between a reference direction 116 extending from the reference point 114 (e.g., toward the 12 o'clock direction), and a direction 117 extending from the reference point 114 toward the start point 113A of the bending line 113 represents a time difference between a reference time point (e.g., a specific time of the hour, a start time point of a to-be-recorded multimedia program, etc.) associated with the reference direction and the start time point. FIG. 7 exemplifies that the multimedia system 2 is scheduled to record a multimedia content fragment from the 4$^{th}$ minute to the 43$^{rd}$ minute of a specific hour (not shown), such as an hour from 18:00 to 19:00. In one embodiment in which the reference time point is a start time point (e.g., 18:30) of a to-be-recorded multimedia program as shown in FIG. 8, an extension region of the bending line 113 between the start point 113A and a point 118 representing 18:30 may have a color different from that of the bending line 113, and the angle between the start point 113A and the point 118 indicates that the recording is scheduled to start 4 minutes after the beginning of the to-be-recorded multimedia program. FIG. 9 exemplarily shows a case in which the multimedia system 2 is scheduled to record a plurality of the multimedia content fragments. In this case, the processing unit 14 causes the display unit 11 to display a plurality of the bending lines 1131-1134 that are spaced apart from each other and that respectively correspond to the multimedia content fragments. In this embodiment, each of the bending lines 1131-1134 has a color corresponding to a channel that has a respective one of the multimedia content fragments. Accordingly, in FIG. 9, the bending lines 1131 and 1133 represent different multimedia content fragments of the same channel, thereby having the same color. In another embodiment, the colors of the bending lines may be used to represent different multimedia programs, and in this case, the bending lines 1131 and 1133 in FIG. 9 would represent different multimedia content fragments of the same multimedia program. When two of the multimedia content fragments have time conflict therebetween, the processing unit 14 may cause the display unit 11 to display a conflict mark (e.g., the dots 1131S-1134S) on a part of each of two of the bending lines 1131-1134 that respectively correspond to the two of the multimedia content fragments (e.g., the pair of the bending lines 1131, 1132, or the pair of the bending lines 1133, 1134), and the part on which the conflict mark is displayed corresponds to a duration in which the two of the multimedia content fragments have the time conflict therebetween.

5. Playback mode: Referring to FIGS. 1 and 6, the processing unit 14 controls the multimedia system 2 to reproduce a (recorded) multimedia content on either the wearable device 1 or the multimedia system 2. In this mode, the bending line 113 represents a duration between a beginning and an end of the multimedia content, has a start point 113A and an end point 113B respectively corresponding to the beginning and the end of the multimedia content, and extends in a form of a spiral. The end point 113B of the bending line 113 is closer to the reference point 114 (see FIG. 2) than the start point 113A when the duration between the beginning and the end of the multimedia content is longer than a predetermined length of time (e.g., 60 minutes). In a case that the duration between the beginning and the end of the multimedia content is not longer than the predetermined length of time, the bending line 113 may form a circular arc centered at the reference point 114 (see FIG. 7), i.e., all points on the bending line 113 are equidistant with respect to the reference point 114. When the input unit 13 senses a user input for triggering operation associated with a user-desired position 113C on the bending line 113, the processing unit 14 operates in a manner similar to that described for the time-shift buffering mode. That is, the processing unit 14 controls the multimedia system 2 to provide to the wearable device 1 a portion 115 of the multimedia content at a user-desired time point corresponding to the user-desired position 113C on the bending line 113, and causes the output unit 10 to output the portion 115 of the multimedia content at the user-desired time point corresponding to the user-desired position 113C on the bending line 113, followed by reproducing the multimedia content from the user-desired time point.

Figure 10:
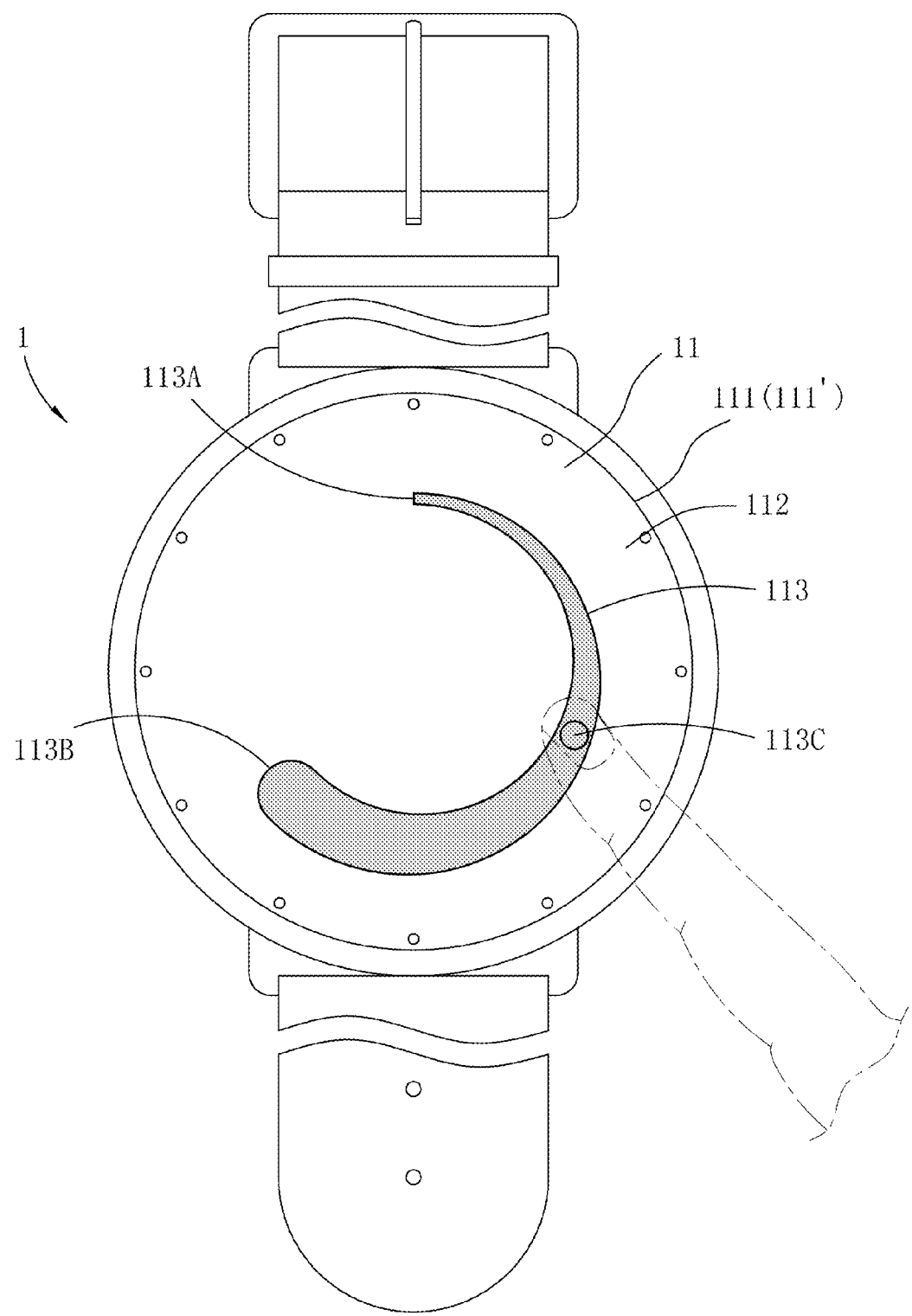
Figure 11:
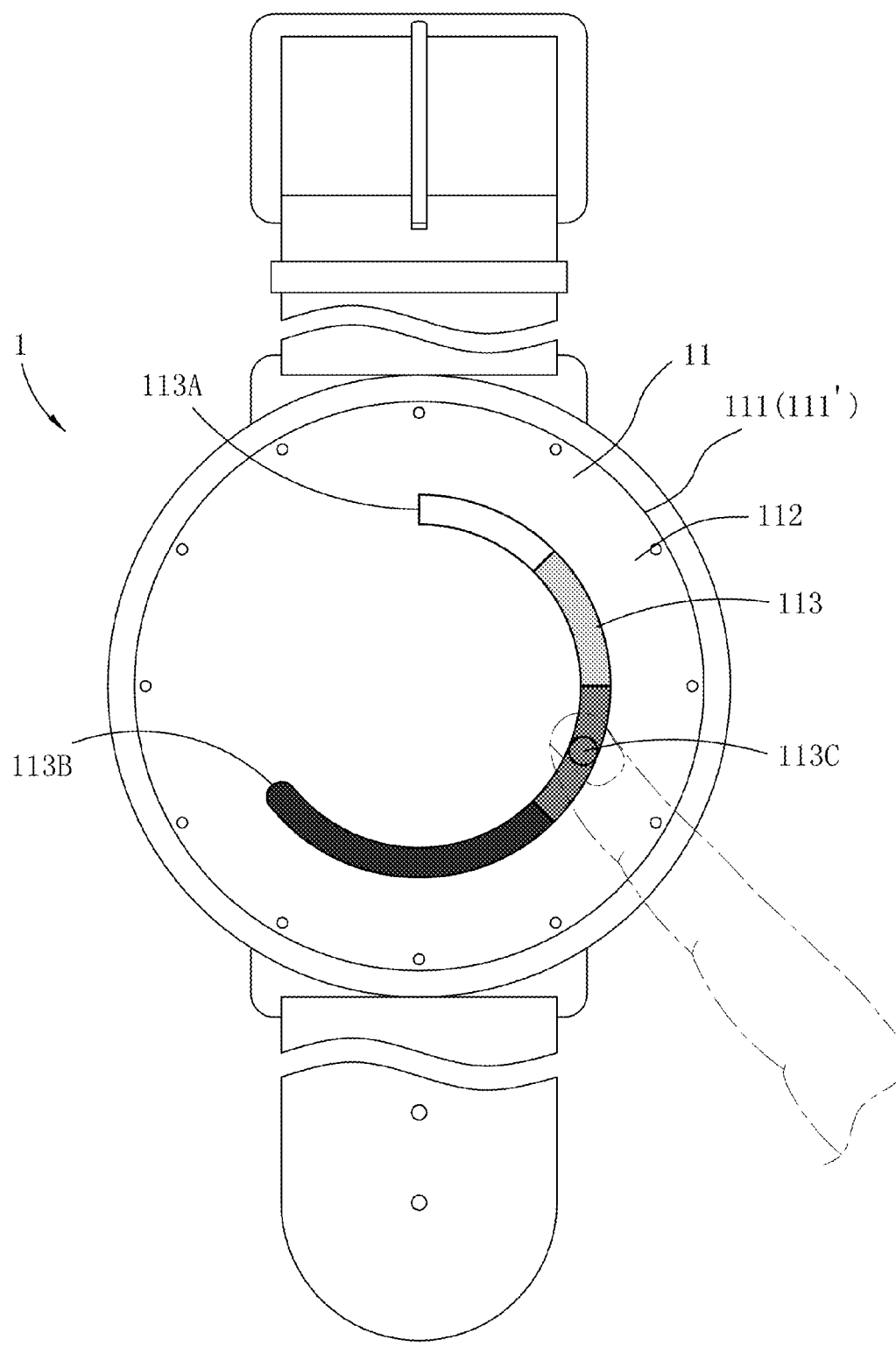
Figure 12:
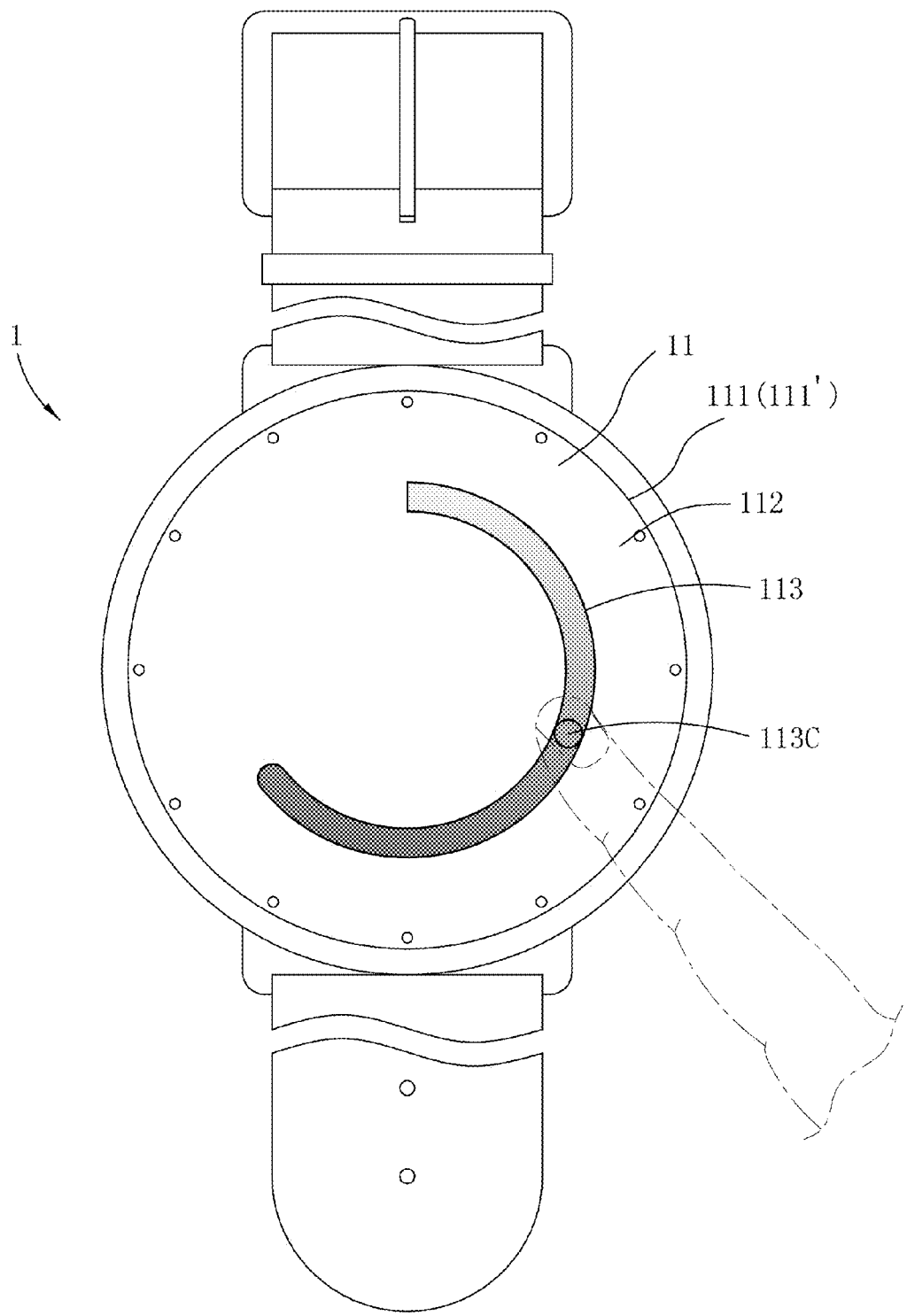

6. Setting control modes: In this embodiment, the setting control modes exemplarily include, but are not limited to, a volume control mode (see FIG. 10), a color control mode (see FIG. 11) and a brightness control mode (see FIG. 12). The bending line 113 in the setting control modes corresponds to a parameter setting of the multimedia system 2. When the input unit 13 senses a user input for triggering operation associated with a user-desired position 113C on the bending line 113, the processing unit 14 controls the multimedia system 2 to set the parameter setting to a level corresponding to the user-desired position 113C. Referring to FIG. 10 that exemplifies the volume control mode, the bending line 113 corresponds to a volume setting of the multimedia system 2, has a start point 113A that represents a minimum volume, an end point 113B that represents a maximum volume, and a thickness that gradually increases from the start point 113A toward the end point 113B. Referring to FIG. 11 that exemplifies the color control mode, the bending line 113 has a plurality of bending line segments that have different colors to represent different ranges of the color setting. Referring to FIG. 12 that exemplifies the brightness control mode, the bending line 113 has a start point 113A that represents a minimum value of the brightness setting, an end point 113B that represents a maximum value of the brightness setting, and a color that gradually changes from the start point 113A toward the end point 113B. Such design may contribute to straightforward operation by the user.

Figure 13:
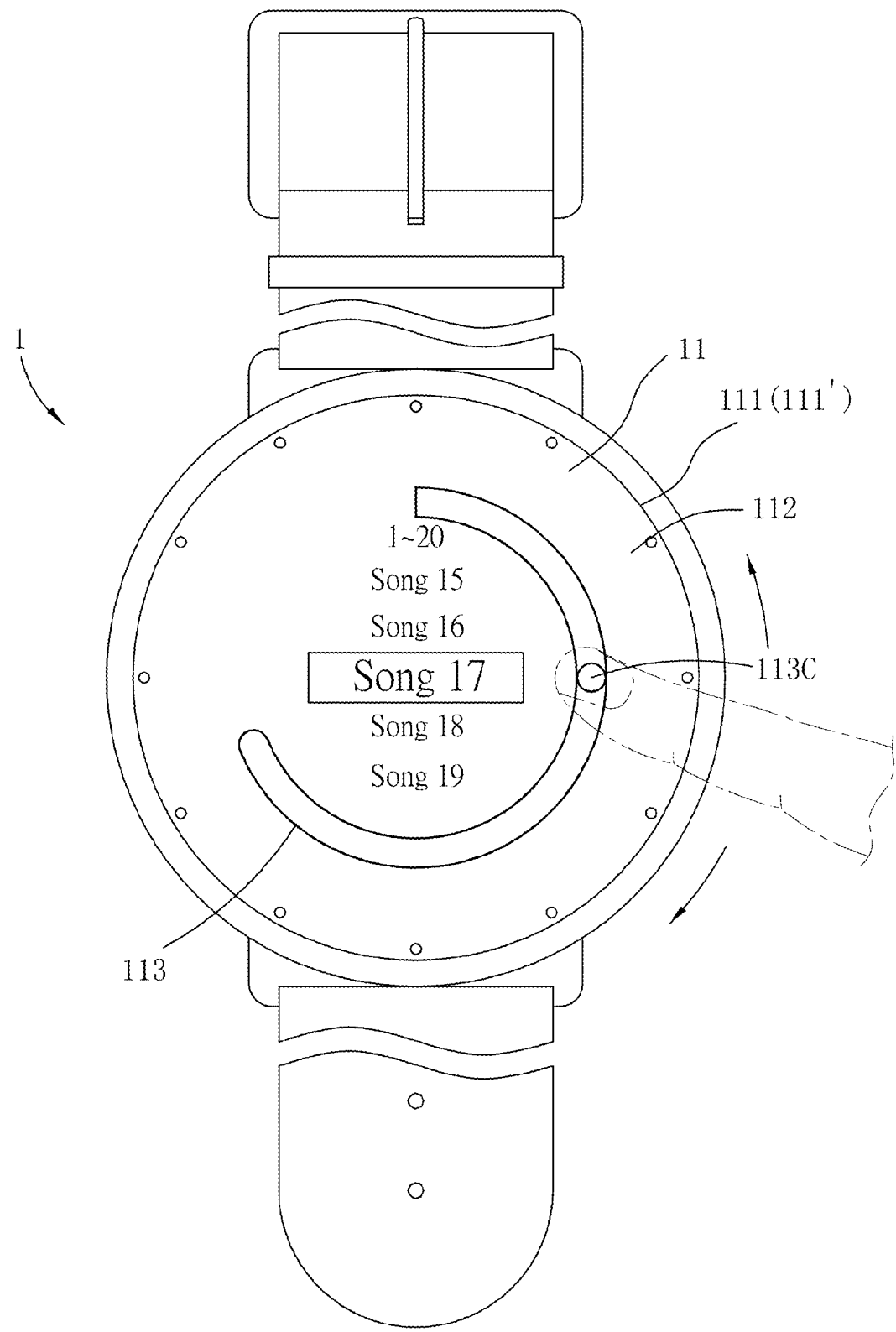

7. List-view mode. Referring to FIGS. 1 and 13, the processing unit 14 controls the multimedia system 2 to provide a list of the multimedia items of the multimedia system 2 (e.g., a list of songs 1-20 that are stored in a USB device connected to a TV of the multimedia system), and causes the display unit 11 to display within the display region 112 a part (e.g., songs 15-19 with the song 17 being at the center) of the list of the multimedia items, and the bending line 113 that represents the list of the multimedia items. When the input unit 13 senses a user input for triggering operation associated with a user-desired position 113C on the bending line 113, the processing unit 14 causes the display unit 11 to display within the display region 112 a part of the list of the multimedia items that corresponds to the user-desired position 113C. When the input unit 13 senses a user input, for example, being one of a clockwise gesture and a counterclockwise gesture, the processing unit 14 causes the display unit 11 to display another part (e.g., songs 14-18 with the song 16 at the center, not shown) of the list of the multimedia items.

Figure 14:
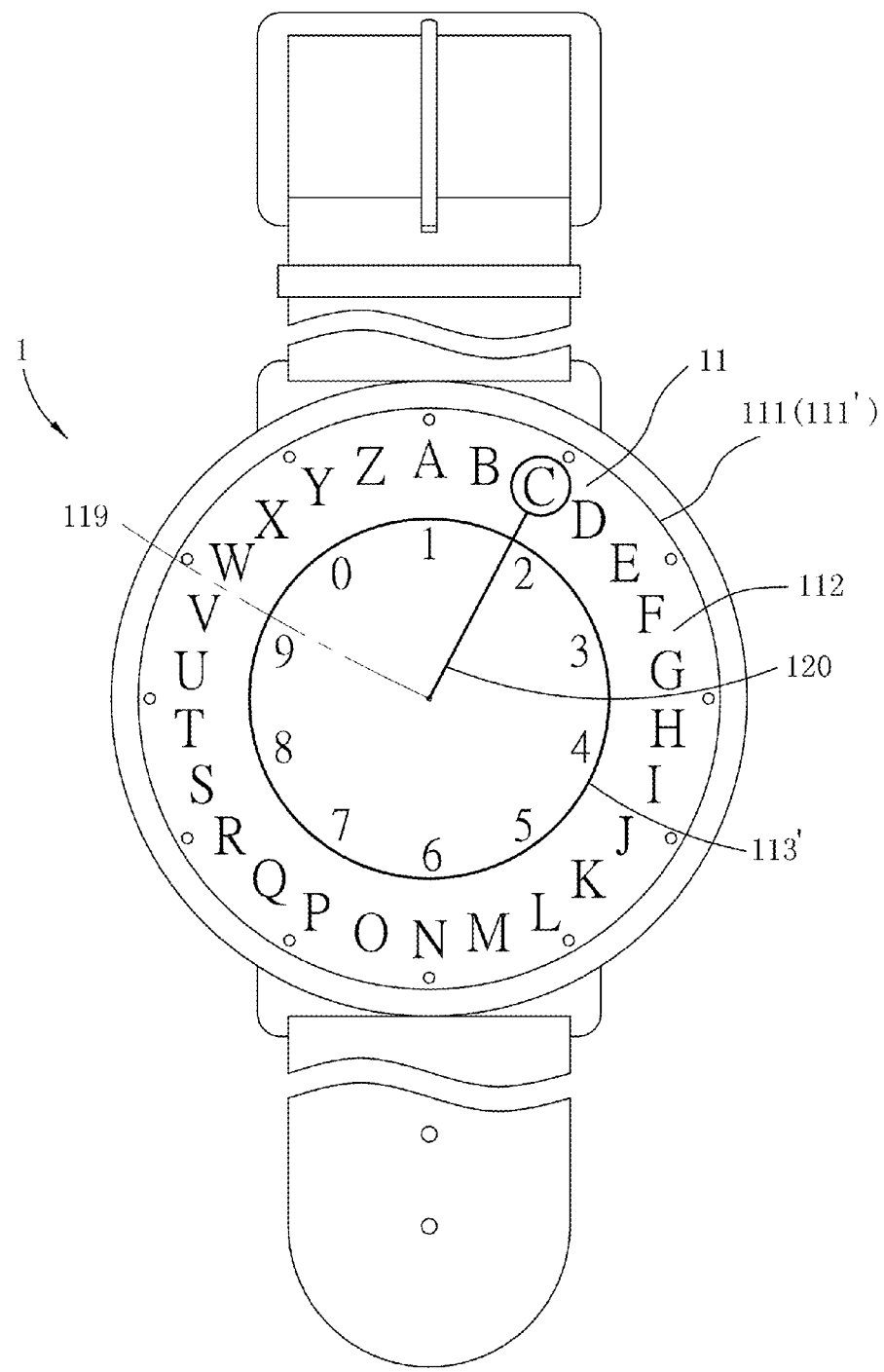
FIG. 14 is a schematic diagram illustrating the embodiment of the wearable device operating in a text-entry mode.

In some embodiments, the processing unit 14 may further selectively operate in a text-entry mode. Referring to FIGS. 1 and 14, in the text-entry mode, the processing unit 14 causes the display unit 11 to display within the display region 112 a text-entry-mode bending line 113' that extends around a text-entry-mode reference point 119 within the display region 112, and to display, within the display region 112, a plurality of symbols (e.g., alphabets A-Z, numbers 0-9, special characters, etc.) beside the text-entry-mode bending line 113' to form a bending symbol string for entry of the symbols into the wearable device 1 by a user through the input unit 13. In some embodiments, the processing unit 14 may further cause the display unit 11 to display within the display region 112 a radial line 120 that extends from the reference point 119 to point out a user-selected symbol, thereby helping entry of the symbols. In some embodiments, the text-entry-mode bending line 113' may act as a thumbwheel for selection of a symbol. In detail, when the input unit 13 senses a clockwise/counterclockwise gesture operation with respect to the text-entry-mode bending line 113', the processing unit 14 causes the display unit 11 to display rotation of the bending symbol string, thereby facilitating entry of the symbols. In addition, since the characters are arranged along the frame/rim 111', it is relatively easy to use gestural typing such as Swype in the small display region 112.

It is noted that the user inputs (i.e., the touches and/or the gestures for triggering specific operations) exemplified in one mode may also be applied to another mode. For example, the operation of channel changing, which is described for the channel-view mode, may also be applied to the program-view mode. Accordingly, descriptions for similar operations in different modes are omitted for the sake of brevity.

It is noted herein that in the examples depicted in the drawings, the bending line 113 is embodied as one of a (circular) arc, multiple arcs, a spiral extending more than 360 degrees, etc. However, in a case where the visible boundary 111 is non-circular, e.g., square-shape or rectangular, the bending line 113 may for instance compose of at least two linear line segments that are interconnected at an angle, and the configuration of the bending line 113 is not limited to the examples illustrated herein.

In summary, by virtue of the bending line 113, 113' extending beside the visible boundary 111 around the reference point 114, the wearable device 1 of this disclosure may use the small display region 112 in a more effective manner to present information more clearly in comparison to the use of the conventional straight bar. The relatively longer length of the bending line 113, 113' may also facilitate control of the multimedia system 2 with touch operations on the wearable device 1. In addition, it is noted that, when the input unit 13 includes the touch screen coincided with the screen of the display unit 11, using the frame 111' to define the display region 112 is advantageous in that a user may recognize the visible boundary 111 by fingers without use of his/her eyes, facilitating user operation associated with the bending line 113 that extends along the visible boundary 111 as the user is, for example, walking or exercising.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A wearable device comprising: an output unit configured to provide perceivable output to users, and including a display unit, said display unit having a visible boundary that defines a display region, and being configured to display images within said display region; a communication unit configured to establish communication with a multimedia system for signal and data transmission therewith; a processing unit coupled to said display unit for signal and data transmission therewith, coupled to said communication unit for signal and data transmission therewith, and configured to, when said communication unit has established communication with the multimedia system, selectively operate in one of a plurality of multimedia modes that include at least one bending-line mode in which said processing unit causes said display unit to display within said display region a bending line which extends beside said visible boundary around a reference point within said display region, and which is associated with information provided by the multimedia system; and an input unit configured to sense a user input for triggering operation associated with images displayed in said display region, and coupled to said processing unit for transmitting the user input thereto; wherein the at least one bending-line mode includes at least one bending-line control mode in which said processing unit controls operation of the multimedia system when said input unit senses a user input for triggering operation associated with the bending line; wherein the at least one bending-line control mode includes a scheduled recording mode in which the bending line represents a time period of a multimedia content fragment between a start time point at which said multimedia system is scheduled to start recording of a multimedia content of a channel, and an end time point at which the multimedia system is scheduled to stop the recording of the multimedia content, and has a start point corresponding to the start time point, and an end point corresponding to the end time point, wherein, in the scheduled recording mode, an angle between a reference direction extending from the reference point, and a direction extending from the reference point toward the start point of the bending line represents a time difference between a reference time point associated with the reference direction and the start time point; wherein, in the scheduled recording mode, when the multimedia system is scheduled to record a plurality of the multimedia content fragments, said processing unit causes said display unit to display a plurality of the bending lines that are spaced apart from each other and that respectively correspond to the multimedia content fragments; and wherein, in the scheduled recording mode, each of the bending lines has a color corresponding to a channel that has a respective one of the multimedia content fragments.

2. The wearable device of claim 1, wherein the at least one bending-line mode further includes a program-view mode in which said processing unit controls the multimedia system to provide program information associated with a multimedia program of a currently tuned channel, and causes said output unit to output the program information; when said input unit senses a user input for triggering operation of pausing in the program-view mode, said processing unit operates such that the output of the program information by said output unit is paused, and starts to operate in one of the at least one bending-line control mode that is a time-shift buffering mode in which said processing unit controls the multimedia system to record the multimedia program; and in the time-shift buffering mode, the bending line represents a time period between a pause time point at which the multimedia system starts to record the multimedia program and a current time point, and has a start point corresponding to the pause time point, and an end point corresponding to the current time point.

3. The wearable device of claim 1, wherein, in the scheduled recording mode, when two of the multimedia content fragments have time conflict there between, said processing unit further causes said display unit to display a mark on a part of each of two of the bending lines that respectively correspond to the two of the multimedia content fragments, the part corresponding to a duration in which the two of the multimedia content fragments have the time conflict there between.

4. The wearable device of claim 1, further comprising a touch screen coincided with said display region, configured to sense a user input with respect to said display region for triggering operation associated with images displayed in said display region, and coupled to said processing unit for transmitting the user input thereto, wherein said display unit includes a frame that physically forms an outer edge of said display unit and said visible boundary.

5. A wearable device comprising: an output unit configured to provide perceivable output to users, and including a display unit, said display unit having a visible boundary that defines a display region, and being configured to display images within said display region; a communication unit configured to establish communication with a multimedia system for signal and data transmission therewith; a processing unit coupled to said display unit for signal and data transmission therewith, coupled to said communication unit for signal and data transmission therewith, and configured to, when said communication unit has established communication with the multimedia system, selectively operate in one of a plurality of multimedia modes that include at least one bending-line mode in which said processing unit causes said display unit to display within said display region a bending line which extends beside said visible boundary around a reference point within said display region, and which is associated with information provided by the multimedia system; and an input unit configured to sense a user input for triggering operation associated with images displayed in said display region, and coupled to said processing unit for transmitting the user input thereto; wherein the at least one bending-line mode includes at least one bending-line control mode in which said processing unit controls operation of the multimedia system when said input unit senses a user input for triggering operation associated with the bending line; wherein the at least one bending-line control mode includes a playback mode in which said processing unit controls the multimedia system to reproduce a multimedia content; wherein, in the playback mode, the bending line represents a duration between a beginning and an end of the multimedia content, and has a start point and an end point respectively corresponding to the beginning and the end of the multimedia content; and wherein, in the playback mode, the bending line extends in a form of a spiral, and the end point of the bending line is closer to the reference point than the start point when the duration between the beginning and the end of the multimedia content is longer than a predetermined length of time.

6. The wearable device of claim 5, wherein, in the playback mode, when said input unit senses a user input for triggering operation associated with a user-desired position on the bending line, said processing unit controls the multimedia system to provide to said wearable device a portion of the multimedia content at a user-desired time point corresponding to the user-desired position on the bending line, and causes said output unit to output the portion of the multimedia content at the user-desired time point corresponding to the user-desired position on the bending line.

7. A wearable device comprising: an output unit configured to provide perceivable output to users, and including a display unit, said display unit having a visible boundary that defines a display region and being configured to display images within said display region; a communication unit configured to establish communication with a multimedia system for signal and data transmission therewith; a processing unit coupled to said display unit for signal and data transmission therewith, coupled to said communication unit for signal and data transmission therewith, and configured to, when said communication unit has established communication with the multimedia system, selectively operate in one of a plurality of multimedia modes that include at least one bending-line mode in which said processing unit causes said display unit to display within said display region a bending line which extends beside said visible boundary around a reference point within said display region, and which is associated with information provided by the multimedia system; and an input unit configured to sense a user input for triggering operation associated with images displayed in said display region, and coupled to said processing unit for transmitting the user input thereto; wherein the at least one bending-line mode includes at least one bending-line control mode in which said processing unit controls operation of the multimedia system when said input unit senses a user input for triggering operation associated with the bending line; wherein the at least one bending-line control mode includes a setting control mode in which the bending line corresponds to a parameter setting of the multimedia system; wherein, in the setting control mode, when said input unit senses a user input for triggering operation associated with a user-desired position on the bending line, said processing unit controls the multimedia system to set the parameter setting to a level corresponding to the user-desired position, and wherein, in the setting control mode, the bending line has a plurality of bending line segments that have different colors to represent different ranges of the parameter setting.

8. The wearable device of claim 7, wherein the setting control mode includes a volume control mode in which the bending line corresponds to a volume setting of the multimedia system, has a start point that represents a minimum volume, an end point that represents a maximum volume, and a thickness that gradually increases from the start point toward the end point.

9. The wearable device of claim 7, wherein, in the setting control mode, the bending line has a start point that represents a minimum value of the parameter setting, an end point that represents a maximum value of the parameter setting, and a color that gradually changes from the start point toward the end point.

10. The wearable device of claim 7, wherein the at least one bending-line control mode includes a list-view mode in which said processing unit controls the multimedia system to provide a list of multimedia items of the multimedia system, and causes said display unit to further display a part of the list of the multimedia items; wherein, in the list-view mode, the bending line represents the list of the multimedia items; and when said input unit senses a user input being one of a clockwise gesture and a counterclockwise gesture, said processing unit causes said display unit to display another part of the list of the multimedia items.

11. A wearable device comprising: an output unit configured to provide perceivable output to users, and including a display unit, said display unit having a visible boundary that defines a display region, and being configured to display images within said display region; a communication unit configured to establish communication with a multimedia system for signal and data transmission therewith; and a processing unit coupled to said display unit for signal and data transmission therewith, coupled to said communication unit for signal and data transmission therewith, and configured to, when said communication unit has established communication with the multimedia system, selectively operate in one of a plurality of multimedia modes that include at least one bending-line mode in which said processing unit causes said display unit to display within said display region a bending line which extends beside said visible boundary around a reference point within said display region, and which is associated with information provided by the multimedia system; wherein the at least one bending-line mode includes a program-view mode in which the bending line has a start point corresponding to a time point at which a multimedia program of a currently tuned channel provided by the multimedia system starts, and an end point corresponding to a time point at which the multimedia program ends.

12. The wearable device of claim 11, further comprising an input unit configured to sense a user input for triggering operation associated with images displayed in said display region, and coupled to said processing unit for transmitting the user input thereto, wherein the at least one bending-line mode includes at least one bending-line control mode in which said processing unit controls operation of the multimedia system when said input unit senses a user input for triggering operation associated with the bending line, wherein the at least one bending-line mode further includes a program-view mode in which said processing unit controls the multimedia system to provide program information associated with a multimedia program of a currently tuned channel, and causes said output unit to output the program information; wherein, when said input unit senses a user input for triggering operation of pausing in the program-view mode, said processing unit operates such that the output of the program information by said output unit is paused, and starts to operate in one of the at least one bending-line control mode that is a time-shift buffering mode in which said processing unit controls the multimedia system to record the multimedia program; and wherein, in the time-shift buffering mode, the bending line represents a time period between a pause time point at which the multimedia system starts to record the multimedia program and a current time point, and has a start point corresponding to the pause time point, and an end point corresponding to the current time point.

13. The wearable device of claim 12, wherein, in the time-shift buffering mode, when said input unit senses a user input for triggering operation associated with a user-desired position on the bending line, said processing unit controls the multimedia system to provide to said wearable device a portion of recorded content of the multimedia program at a user-desired time point corresponding to the user-desired position on the bending line, and causes said output unit to output the portion of the recorded content at the user-desired time point.

14. The wearable device of claim 11, wherein, in the program-view mode, said processing unit controls the multimedia system to provide program information associated with the multimedia program, and causes said output unit to output the program information.

15. The wearable device of claim 14, further comprising an input unit configured to sense a user input for triggering operation associated with images displayed in said display region, and coupled to said processing unit for transmitting the user input thereto; wherein the multimedia modes include a channel-view mode in which said processing unit controls the multimedia system to provide channel information associated with the currently tuned channel to said wearable device, and causes said display unit to display the channel information; in the channel-view mode, when said input unit senses a user input for triggering operation of program viewing, said processing unit starts to operate in the program-view mode; and in the channel-view mode, when said input unit senses a user input for triggering operation of channel changing, said processing unit controls the multimedia system to tune to another one of different channels.

16. The wearable device of claim 15, wherein the user input for triggering operation of channel changing is one of a clockwise gesture and a counterclockwise gesture; when said input unit senses the clockwise gesture, the different channels are channels arranged after the currently tuned channel, and said processing unit controls the multimedia system to tune to the different channels one by one; and when said input unit senses the counterclockwise gesture, the different channels are channels arranged before the currently tuned channel, and said processing unit controls the multimedia system to tune to the different channels one by one.

17. The wearable device of claim 16, wherein, when said input unit senses that the user input for triggering operation of channel changing has lasted for a predetermined duration, said processing unit controls the multimedia system to accelerate tuning to the different channels.

18. The wearable device of claim 11, further comprising an input unit configured to sense a user input for triggering operation associated with images displayed in said display region, and coupled to said processing unit for transmitting the user input thereto, wherein, in the program-view mode, when said input unit senses a user input for triggering operation of introducing another program, said processing unit controls the multimedia system to provide program information associated with another multimedia program of the currently tuned channel, and causes said display unit to display the program information associated with the another multimedia program.

19. The wearable device of claim 11, further comprising an input unit configured to sense a user input for triggering operation associated with images displayed in said display region, and coupled to said processing unit for transmitting the user input thereto, wherein, in the program-view mode, when said input unit senses a user input for triggering operation of introducing another channel, said processing unit controls the multimedia system to provide program information associated with a multimedia program of another channel, and causes said display unit to display the program information associated with the multimedia program of the another channel.

20. A wearable device comprising: an output unit configured to provide perceivable output to users, and including a display unit, said display unit having a visible boundary that defines a display region, and being configured to display images within said display region: a communication unit configured to establish communication with a multimedia system for signal and data transmission therewith; a processing unit couple to said display unit for signal and data transmission therewith, coupled to said communication unit for signal and data transmission therewith, and configured to, when said communication unit has established communication with the multimedia system, selectively operate in one of a plurality of multimedia modes that include at least one bending-line mode in which said processing unit causes said display unit to display within said display region a bending line which extends beside said visible boundary around a reference point within said display region, and which is associated with information provided by the multimedia system; and an input unit configured to sense a user input for triggering operation associated with images displayed in said display region, and coupled to said processing unit for transmitting the user input thereto, wherein said processing unit is further configured to selectively operate in a text-entry mode in which said processing unit causes said display unit to display within said display region a text-entry-mode bending line that extends around a text-entry-mode reference point within said display region, and to display, within said display region, a plurality of symbols beside the text-entry-node bending line for entry of the symbols by a user through said input unit.

21. The wearable device of claim 20, wherein, in the text-entry mode, the symbols are displayed beside the text-entry-mode bending line to form a bending symbol string; and when said input unit senses one of a clockwise gesture or a counterclockwise gesture with respect to the text-entry-mode bending line, said processing unit causes said display unit to display rotation of the bending symbol string in a direction corresponding to that of said one of the clockwise gesture or the counterclockwise gesture.

22. The wearable device of claim 20, further comprising an input unit configured to sense a user input for triggering operation associated with images displayed in said display region, and coupled to said processing unit for transmitting the user input thereto, wherein, in at least one of the multimedia modes, said processing unit further causes said display unit to display a mark proximate to said visible boundary, and when said input unit senses a user input for triggering operation associated with the mark, said processing unit starts to operate in another one of the multimedia modes.

* * * * *